W. S. SHERMAN.
SAW MOUNTING.
APPLICATION FILED MAY 15, 1916.
1,271,233.
Patented July 2, 1918.
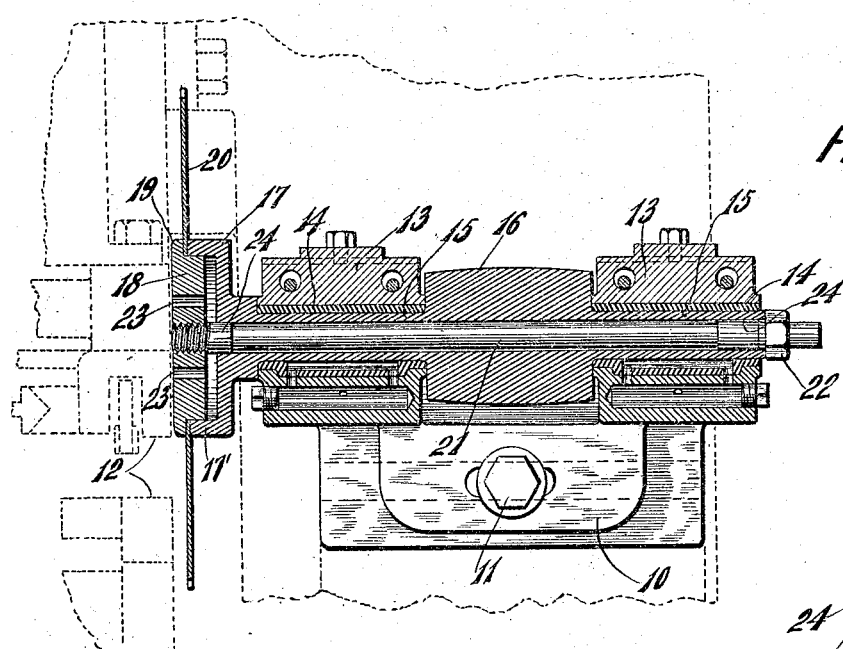
Fig. 1
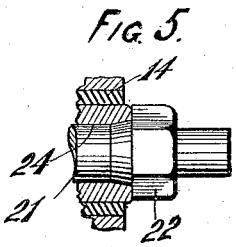
Fig. 5
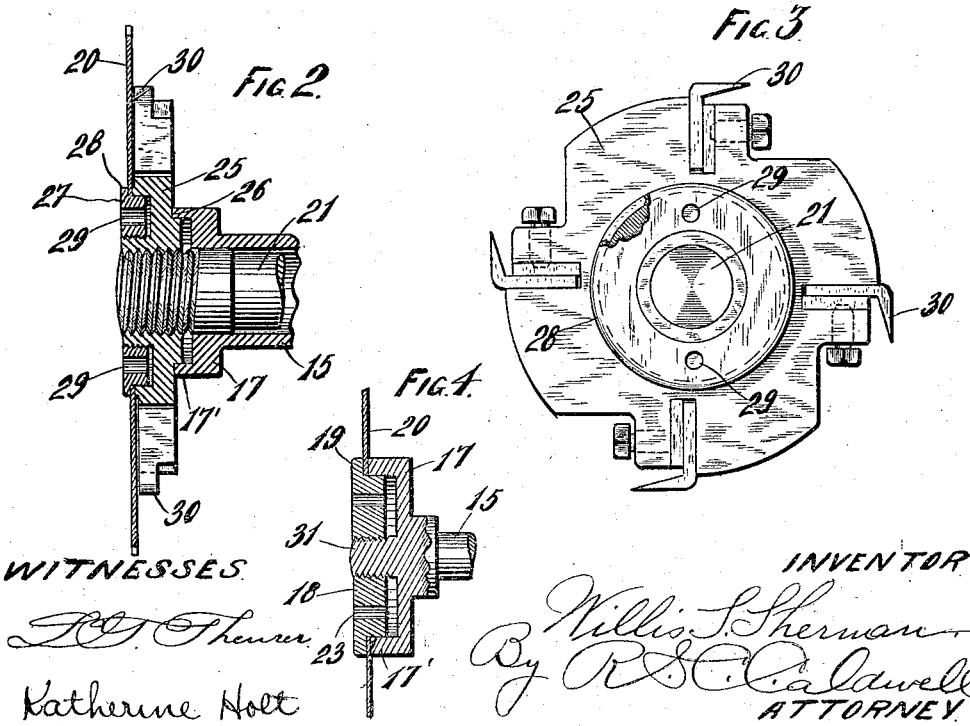
WITNESSES
INVENTOR
Willis S. Sherman
By R. S. C. Caldwell
ATTORNEY

UNITED STATES PATENT OFFICE.

WILLIS S. SHERMAN, OF MILWAUKEE, WISCONSIN.

SAW-MOUNTING.

1,271,233.    Specification of Letters Patent.    Patented July 2, 1918.

Application filed May 15, 1916. Serial No. 97,472.

*To all whom it may concern:*

Be it known that I, WILLIS S. SHERMAN, a citizen of the United States, and resident of Milwaukee, in the county of Milwaukee and State of Wisconsin, have invented new and useful Improvements in Saw-Mountings, of which the following is a description, reference being had to the accompanying drawings, which are a part of this specification.

This invention has for its object to provide a saw mounting with improved means for clamping the saw thereto which will lie close to the face of the saw blade and will thereby enable the saw to be positioned close to the work support.

Another object of the invention is to permit of the saw clamping means being so constructed as to effect a minimum degree of protuberance from the face of the saw blade and still have the clamping means of the requisite strength and provided with a screw thread engagement of adequate length.

Another object of the invention is to provide a saw mounting in which the clamping action for clamping the saw blade to the arbor may be performed at the end of the arbor which does not carry the saw, thus avoiding the necessity for turning a clamping nut at or near the face of the saw.

With the above and other objects in view the invention consists in the saw mounting as herein claimed and all equivalents.

Referring to the accompanying drawings, in which like characters of reference indicate the same parts in the different views, Figure 1 is a longitudinal sectional view of a saw mounting constructed in accordance with this invention and applied to an end matcher, parts of which are shown in dotted lines;

Fig. 2 is a detail view of a modification thereof in which the saw is mounted on a cutter head;

Fig. 3 is an end view of the cutter head with the saw removed;

Fig. 4 is a sectional view of another modification of the invention; and,

Fig. 5 is a detail view of one end of the clamping bolt.

In these drawings 10 indicates a suitable bearing bracket which may be adjustably mounted by a stud and slot connection 11 to permit of its adjustment with relation to a work clamping means 12. The bearing bracket 10 is provided with bearing members 13 which may contain bushings 14 with a tubular arbor 15 rotatably mounted therein, such arbor being provided with a driving pulley 16 between the bearings and with a head 17 at one end having an annular flange 17' around its edge. The flange of the arbor head 17 has closely fitted within it an arbor collar 18 with an outwardly extending flange 19. A saw blade 20 has a central opening which closely fits around the arbor collar 18 so as to be centered thereby, and the inner edge of the saw blade is tightly clamped between the flange 19 of the arbor collar and the edge of the flange of the arbor head. Such clamping action is produced by a bolt 21 which passes through the bore of the arbor and has a shouldered head 22 on one end and screw threads on the other end to engage a central threaded opening of the arbor collar 18. By turning the bolt 21 with a wrench engaged with the shouldered head 22, while the collar 18 is held against turning by means of a spanner wrench engaging openings 23 therein, the flange 19 of the collar 18 is drawn tightly against the saw 20, clamping it securely between said flange and the flange of the arbor head 17. The bolt 21 is preferably provided with enlargements 24 near its ends to fit the bore of the arbor, while the enlargement near the head 22 is slightly tapered to fit a correspondingly flaring portion of the bore of the arbor to prevent the bolt from turning in the collar should the collar be turned by the saw blade.

By means of this invention the saw blade may be set close to the work guiding clamping means 12 so that the cut may be made close to the work support, which is very desirable, and this without sacrificing the strength of the arbor collar or any part of the saw mounting. The saw blade is accurately centered without depending upon the inaccuracy of centering by screw threads, for the arbor collar 18 is centered within the flange 17' of the arbor head without depending upon a screw thread fit therewith, and the saw blade itself is fitted upon said collar and is accurately centered thereby.

With the bearing bracket 10 moved away from the work support a spanner wrench may be engaged with the openings 23 and held tightly against turning while the wrench at the outer end of the bolt is turned, thus permitting the necessary force to be applied for securely clamping the saw without having to move the saw bracket far enough to work between the saw face and the work support.

In that form of the invention shown in Figs. 2 and 3 a shouldered cutter head 25 is substituted for the flanged arbor collar 18, the shoulder 26 thereof fitting within the flange of the arbor head 17 so as to be centered thereby, while the bolt 21 is threaded in the central opening of the cutter head in the same manner as with the collar 18. A flanged collar 27 is threaded on a boss of the cutter head 25 and into a recess in the face thereof, and the saw blade 20 fits on said collar 27 and is centered thereby and is clamped between the flange 28 thereof and the face of the cutter head, the collar in this instance being tightened by the spanner wrench fitting in openings 29, and such clamping engagement being effected before the cutter head is clamped to the arbor spindle 15. All parts may be tightened together by fitting the spanner wrench in the openings 29 and turning the bolt 21 as before, thus drawing the cutter head 25 tightly against the centering flange of the arbor 15 and clamping the saw in place. Suitable chip cutters 30 may be secured to the cutter head 25 in the usual manner to rapidly remove the end of the work beyond the saw kerf. With this form of the invention there are the same features of advantage as with the other, the tightening being performed at the outer end of the arbor and the saw being positioned close to the work support.

In that form of the invention shown in Fig. 4 the bolt 21 is dispensed with and the arbor is solid instead of tubular, the arbor collar 18 being threaded directly upon a central projecting stud 31 corresponding with the bolt end. This form of the invention may have some of the advantages of the others so far as the reduction of protuberance from the face of the saw is concerned, though the construction shown in Fig. 1 is preferred as not requiring the arbor collar 18 to turn with respect to the saw blade and the arbor in order to effect or release the clamping action thereof.

All three forms of the invention provide for centering the saw blade by means of an arbor collar which itself is centered within the arbor head and without depending upon a threaded surface for so doing, thus centering the saw with accuracy.

What I claim as new and desire to secure by Letters Patent is:

1. A saw mounting, comprising a rotatably mounted arbor having an axial opening extending therethrough and a concentric flange at one end thereof, a circular saw having a central opening, a flanged member fitting within the saw opening and within the arbor flange to center the saw, and a clamping bolt passing through the opening of the arbor and engaging the flanged member for clamping the saw between the flange of said member and the flange of the arbor.

2. A saw mounting, comprising a rotatably mounted arbor having an axial opening therethrough and a concentric flange at one end thereof, a saw bearing against the flange and having a central opening, a flanged member fitting within the opening of the saw and within the flange of the arbor for centering the saw and engaging the saw between its flange and the flange of the arbor, and a clamping bolt passing through the opening of the arbor with a head at one end bearing against the end of the arbor and the other end threaded in the flanged member.

3. A saw mounting, comprising a rotatably mounted arbor having an axial opening therethrough and having a concentric flange at one end thereof, a circular saw bearing against the arbor flange and provided with a central opening, a flanged arbor collar fitting within the opening of the saw and within the arbor flange for centering the saw and clamping it between the arbor collar and the arbor flange, a clamping bolt passing through the opening of the arbor and having enlarged portions near its ends fitting in said opening with a head on one end and the other end threaded in the arbor collar, there being a wrench-engaging means on the arbor collar.

4. In a saw mounting, a rotatably mounted arbor having a head provided with a concentric annular flange, a flanged arbor collar fitting within the annular flange of the arbor head, a saw blade having a central opening fitting upon the arbor collar and having its edge around said opening clamped between the flange of the arbor collar and the annular flange of the arbor head, and means for clamping the arbor collar and the arbor together.

5. In a saw mounting, a rotatably mounted arbor having a cup-shaped head with a concentric annular flange around its edge, an arbor collar having a cylindrical surface fitting within the bore of said annular flange and provided with an outwardly extending flange around such cylindrical surface, a saw blade having a central opening fitting around the cylindrical surface of the arbor collar and held between the flange of the arbor collar and the edge of the annular flange of the arbor head, a centrally threaded stud on the arbor projecting into the cup-shaped head thereof and having its screw threads fitting within the arbor collar by which the arbor collar may clamp the saw blade in place.

In testimony whereof, I affix my signature, in presence of two witnesses.

WILLIS S. SHERMAN.

Witnesses:
KATHERINE HOLT,
R. S. C. CALDWELL.